United States Patent [19]
Robertson

[11] 3,759,993
[45] Sept. 18, 1973

[54] FLUOROMETHANESULFONIC ACID DERIVATIVES
[75] Inventor: Jerry E. Robertson, North Oaks, Minn.
[73] Assignee: Riker Laboratories, Inc., Northridge, Calif.
[22] Filed: Sept. 27, 1971
[21] Appl. No.: 184,229

[52] U.S. Cl. ......... 260/556 A, 260/556 F, 260/575, 424/321
[51] Int. Cl. .......................................... C07c 143/74
[58] Field of Search .................... 260/556 F, 556 A

[56] References Cited
UNITED STATES PATENTS
3,341,584  9/1967  Larsen et al. .................. 260/556 A
3,644,520  2/1972  Hartley et al. ................. 260/556 A Primary Examiner—Henry R. Jiles
Assistant Examiner—S. D. Winters
Attorney—Alexander, Sell, Steldt & Delahunt

[57]  ABSTRACT

The compounds disclosed are the amphoteric compound 2-hydroxy-5-[1-hydroxy-2-(4'-methoxyphenethylamino)propyl]-fluoromethanesulfonanilide and its acid addition and metal salts. These compounds have physiological activity, including significant insecticidal activity evinced as activity against mosquito larvae.

6 Claims, No Drawings

FLUOROMETHANESULFONIC ACID DERIVATIVES

BACKGROUND OF THE INVENTION

Substituted methanesulfonanilides are known, and are broadly disclosed in the prior art, as, for example, in U.S. Pat. Nos. 3,341,584 and 3,478,149. The compounds disclosed in these patents are described as having physiological activity, but this did not include insecticidal activity. A compound closely related to the base of the present invention, 2-hydroxy-5-[1-hydroxy-2-(4'-methoxyphenethylamino)propyl]-methanesulfonanilide, described in the said patents, has physiological activity but is inactive towards mosquito larvae. The compound and its salts which are described and claimed herein have strong activity as mosquito larvicides, as well as other useful physiological activity, e.g., bronchodilator activity in the mammalian organism.

DETAILED DESCRIPTION OF THE INVENTION

This invention relates to the compound 2-hydroxy-5-[1-hydroxy-2-(4'-methoxyphenethylamino)propyl]-fluoromethanesulfonanilide and its salts, and to a process for the preparation of the compounds of the invention. This invention also relates to novel intermediates useful for the preparation of the final product compounds of the invention.

The intermediates and final product compounds of the present invention are prepared using the reaction sequence illustrated below starting with the known compounds 3-amino-4-benzyloxypropiophenone and fluoromethanesulfonyl chloride.

The product isolated from step (4) of the reaction sequence shown is the acid addition salt of the base 2-hydroxy-5-[1-hydroxy-2-(4'-methoxyphenethylamino)propyl]fluoromethanesulfonanilide. Acid addition salts of the novel amphoteric compound are readily converted to the free base. This can be done, for example, by neutralizing a solution of the salt in water with an equimolar solution of sodium bicarbonate and azeotroping off the water with benzene. The residue is extracted with acetone, then the acetone is evaporated to give 2-hydroxy-5-[1-hydroxy-2-(4'-methoxyphenethylamino)propyl]fluoromethanesulfonanilide as a white solid.

It will be apparent to those skilled in the art that the final product compound of the invention (and its salts) contains two asymmetric carbon atoms, and two racemic modifications of the product exist, each of which consists of a pair of enantiomorphic forms. All of these four enantiomorphic forms (and their salts) are included within the scope of this invention.

The basic compound of this invention is an amphoteric substance, forming salts with both acids and bases. These salts are considered part of this invention. Each of the salts has a utility, since it may be converted to the compound of the invention and the compound of the invention may be converted to other salts. Acid addition salts with optically active acids such as d-camphorsulfonic acid are useful for resolution of the enantiomorphic pairs. Preferred salts are those with pharmaceutically acceptable acids and metals.

Examples of acid addition salts include the hydrochloride, hydrobromide, phosphate, sulfate, acetate, propionate, nitrate, gluconate, succinate, mucate, methanesulfonate, oxalate and the like. Examples of metal salts are the lithium, sodium and potassium (alkali metal) salts.

The metal salts may be formed by reaction of the compound of the invention with equimolar quantities of metal hydroxides, alkoxides, carbonates and the like, as will be apparent to those skilled in the art.

The infrared spectrum of the free base indicates that it exists as the internal salt of the formula:

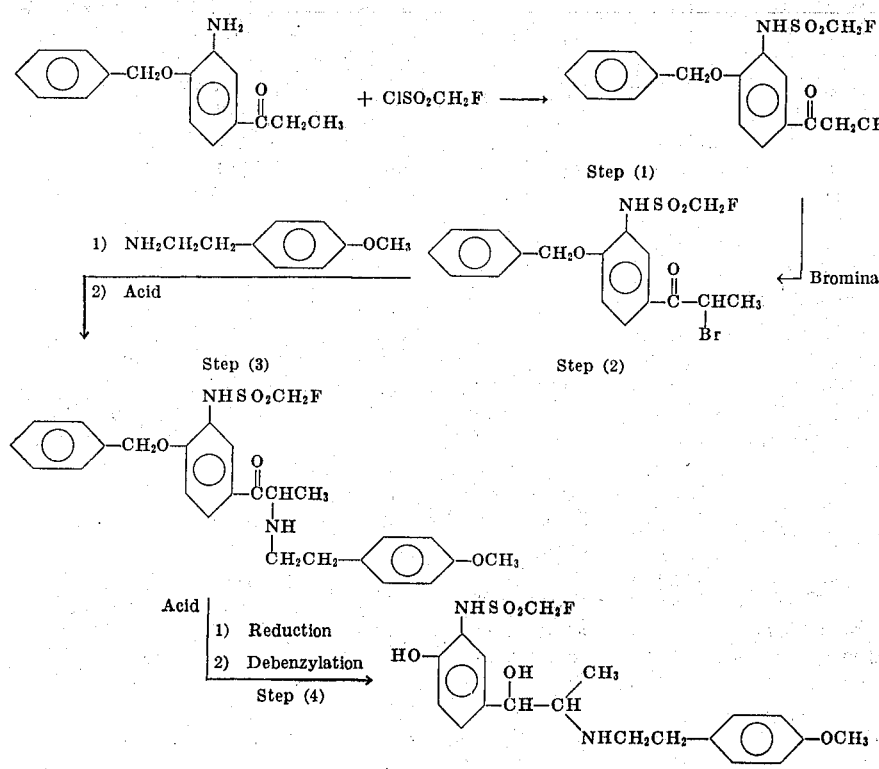
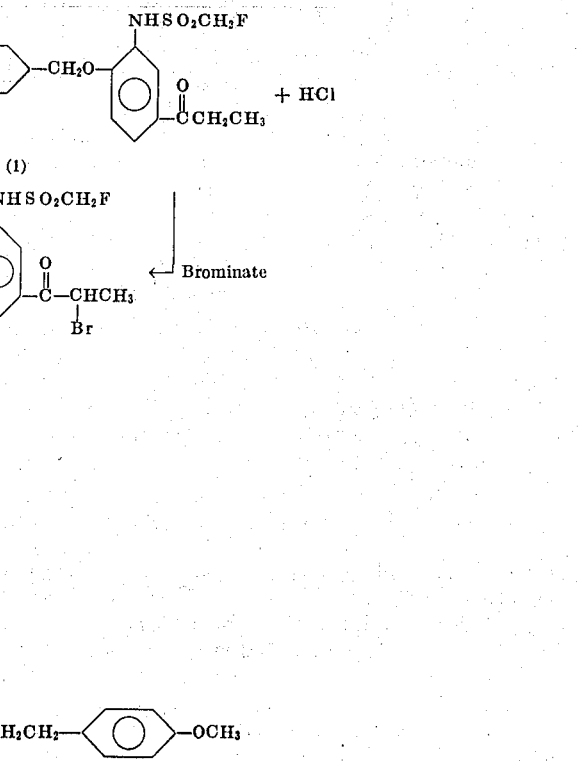

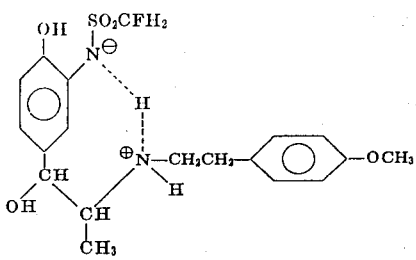

Specific illustration of the process step in the reaction sequence shown is provided by the following example. All parts are by weight unless otherwise specified. Analyses are shown in percentages.

Example 1

To a stirred solution of 3'-amino-4'-benzyloxypropiophenone (80 g., 0.31 mole), dimethylaniline (41.2 g., 0.34 mole) and chloroform (400 ml.) is added dropwise fluoromethanesulfonyl chloride (41.2 g., 0.31 mole) over a peirod of 30 minutes. A slight exotherm results. The solution is stirred for about 64 hours. The solution is washed with dilute hydrochloric acid, washed with water and dried over magnesium sulfate. The solvent is evaporated *in vacuo*, yielding a yellowish solid. Recrystallization from ethanol gives 2-benzyloxy-5-pripionylfluoromethanesulfonanilide, m.p. 110°–111° C.

Analysis:

Calculated for $C_{17}H_{18}FNO_4S$: C, 58.1; H, 5.2

Found: C, 58.6; H, 5.3.

Cupric bromide (84 g., 0.375 mole) in ethyl acetate (300 ml.) is heated to reflux temperature and stirred while refluxing for two hours. 2-Benzyloxy-5-propionylfuloromethanesulfonanilide (82 g., 0.234 mole) is added, dissolved in ethyl acetate (150 ml.) and chloroform (150 ml.). The resulting mixture is stirred at room temperature for six hours. The reaction mixture is filtered, the filtrate is treated with decolorizing charcoal and the resulting solution is evaporated to yield an oil. The oil is taken up in ethanol, treated with decolorizing charcoal and diluted with water, but upon cooling an oil is obtained. Evaporation of the solvent *in vacuo* gives an oil. The oil is taken up in isopropanol, treated with decolorizing charcoal and filtered. Seed crystals are added while cooling, and a solid is obtained. The solid is again recrystallized from isopropanol, triturating with benzene. Solid 2-benzyloxy-5-(2-bromopropionyl)fluoromethanesulfonanilide, m.p. 76°–81° C. is obtained. A proton magnetic spectrum shows that this solid contains about 45 percent benzene of crystallization.

Aluminum chloride (0.025 g.) and 2-benzyloxy-5-propionylfluoromethanesulfonanilide (8.8 g., 0.025 mole) are suspended in diethyl ether (50 ml.) and the mixture is stirred vigorously at room temperature while adding bromine (4.0 g., 0.024 mole) dropwise over twenty minutes. The orange-red mixture is stirred one hour at room temperature. The mixture is filtered and diethyl ether (75 ml.) is added. The filtrate is washed in succession with water, 5 percent sodium bicarbonate solution and saturated sodium chloride solution. The solution is then dried over magnesium sulfate and the solvent evaporated *in vacuo* to give a yellow-orange oil which slowly crystallizes. The product, 2-benzyloxy-5-(2-bromopropionyl)fluoromethanesulfonanilide is a white solid, m.p. 77°–79° C., after recrystallizing three times from trichloroethylene with treatment with decolorizing charcoal.

Analysis:

Calculated for $C_{17}H_{17}BrFNO_4S$: C, 47.5; H, 4.0; N, 3.25

Found: C, 47.9; H, 4.0; N, 3.1.

To a solution of 4-methoxyphenethylamine (25 g., 0.165 mole) in methanol (25 ml.) cooled to 0° to 5° C. is added 2-benzyloxy-5-(2-bromopropionyl)fluoromethanesulfonanilide (15 g., 0.035 mole) in small portions over a period of 1.5 hours. The mixture is stirred for an additional 2 hours. The pH is adjusted to about 1 by the addition of 15 ml. of concentrated hydrochloric acid. An additional 25 ml. of methanol is added, and the mixture is stirred one-half hour. The mixture is filtered and the filtrate is concentrated to one-half of its volume. The resulting solid is separated by filtration and examined by infrared spectroscopy, showing it to be chiefly 4'-methoxyphenethylamine hydrochloride. The filtrate is diluted with diethyl ether, and the solid is separated by filtration and examined by infrared spectroscopy. A strong carbonyl absorption is present, indicating the desired product. This solid is extracted twice with hot ethanol, leaving solid 2-benzyloxy-5-[2-(4'-methoxyphenethylamino)propionyl]fluoromethanesulfonanilide hydrochloride, m.p. 212°–215° C.

To a solution of 2-benzyloxy-5-[2-(4'-methoxyphenethylamino)propionyl]fluoromethanesulfonanilide hydrochloride (3.6 g., 0.0067 mole) in ethanol (100 ml.) is added 0.5 g. of palladium on carbon, and the mixture is hydrogenated at room temperature in a Parr hydrogenator (maximum hydrogen pressure about 50 psi) for 12 hours.

The reaction mixture is treated with decolorizing charcoal, filtered and the solvent removed by evaporation *in vacuo*. The white solid is dissolved in isopropanol, treated with decolorizing charcoal and, following the addition of diethyl ether, crystallizes slowly forming white, solid 2-hydroxy-5-[1-hydroxy-2-(4'-methoxyphenethylamino)propyl]fluoromethanesulfonanilide hydrochloride, m.p. 175°–180° C.

Analysis:

Calculated for $C_{19}H_{26}ClFN_2O_5S$: C, 50.1; H, 5.8; N, 6.2

Found: C, 50.5; H, 5.7; N, 6.1.

A sample of 2-hydroxy-5-[1-hydroxy-2-(4'-methoxyphenethylamino)propyl]fluoromethanesulfonanilide hydrochloride (1.12 g., 0.025 mole) is dissolved in water (20 ml.). A solution of sodium bicarbonate (0.21 g., 0.025 mole) in a minimum amount of water is added with stirring and the mixture is evaporated *in vacuo*. Benzene is added and the mixture again evaporated thrice to remove traces of water. The residue is triturated with acetone and filtered. The filtrate is evaporated to dryness yielding 2-hydroxy-5-[1-hydroxy-2-(4'-methoxyphenethylamino)propyl]-fluoromethanesulfonanilide as a foamy white crystalline solid, crude m.p. 60°–75° C. Its structure is confirmed by nuclear magnetic resonance and infrared spectral measurement.

In order to determine the mosquito larvicidal activity of 2-hydroxy-5-(1-hydroxy-2-[4'-methoxyphenethylamino)propyl]-fluoromethanesulfonanilide hydrochloride the following test was run. *Aedes aegypti* mosquito eggs are hatched in distilled water. The larvae are fed on finely ground dog chow. After five to seven days, the larvae are ready for use. Two replicates are used for each concentration. A stock solution of compound is made by dissolving 0.236 g. of compound in acetone (15 ml.) to give a concentration of 20,000 ppm. A sample of 1.25 ml. of this solution is mixed with 48.75 ml. of water to provide a 500 ppm solution. Measured amounts of this solution are added to vials containing 10 to 15 mosquito larvae to give concentrations of 200, 100 and 50 parts per million respectively. Control vials with larvae are also maintained in water without added larvicide. After 3 hours and 4½ hours mortality data are taken. The results are shown in Table I.

TABLE I

| Compound | Concentration (in ppm) | 3 hours | 4.5 hours |
|---|---|---|---|
| Compound of the example | 200 | 87 | 100 |
|  | 100 | 97 | 100 |
|  | 50 | 60 | 82 |
| Control | — | 0 | 0 |

The compounds of the invention have bronchodilator activity which is manifested in a standard test for such activity (isolated tracheal spiral). The tests performed heretofore have indicated that the mechanism of bronchodilator activity may be different from that of 2-hydroxy-5-[1-hydroxy-2-(4'-methoxyphenethylamino)propyl]methanesulfonanilide. The intravenous toxicity of the compounds of the invention (as the hydrochloride) also appears to be significantly lower.

An alternative, and presently preferred, process is illustrated in Example 2 below. The preferred proces provides improved yields. This process requires that the acidic sulfon-amido nitrogen atom of the intermediate compound 2-benzyloxy-5-propionylfluoromethanesulfonanilide be "blocked" by reaction with benzyl chloride to form the benzyl derivative. This "blocked" compound is carried through the remainder of the sequence described on page 2, which is more specifically illustrated as follows:

Example 2

To a stirred solution of potassium carbonate (2.07 g., 15 mmole) and sodium iodide (0.10 g.) in water (10 ml.) is added 2-benzyloxy-5-propionylfluoromethanesulfonanilide (3.51 g., 10 mmoles), prepared as described in Example 1, and benzyl chloride (1.52 g., 12 mmoles) in glyme (15 ml.). The mixture is heated to its reflux temperature and maintained at reflux for one day, cooled to room temperature and evaporated under vacuum. The residue is extracted with dichloromethane, then the organic extract is washed with water, 10 percent sodium hydroxide solution then water again. The organic solution is then evaporated under vacuum to an oil which solidifies slowly. Recrystallization from ethanol and treatment with decolorizing charcoal (twice) provides ivory-colored needles (2.6 g., 59 percent) of N-benzyl-2-benzyloxy-5-propionylfluoromethanesulfonanilide, m.p. 90-91.5° C.
Analysis:
Calculated for $C_{24}H_{24}FNO_4S$: C, 65.3; H, 5.5; N, 3.2
Found: C, 65.0; H, 5.6; N, 3.1.

To a refluxing solution of cupric bromide (4.24 g., 19 mmoles) in ethyl acetate (15 ml.) is added dropwise a solution of N-benzyl-2-benzyloxy-5-propionylfluoromethanesulfonanilide (4.4 g., 10 mmoles) in chloroform (15 ml.). The mixture is maintained at reflux for six hours, cooled and filtered. The filtrate is diluted with chloroform (30 ml.), washed with water, 5 percent sodium bicarbonate solution, then water again. After drying, the organic solution is evaporated under vacuum. The crude product (7.8 g.) is recrystallized from ethanol with treatment with decolorizing charcoal (twice) to provide 1.3 g. (25 percent) of N-benzyl-2-benzyloxy-5-(2-bromopropionyl)fluoromethanesulfonanilide, m.p. 108°-109° C.
Analysis:
Calculated for $C_{24}H_{23}BrFNO_4S$: C, 55.4; H, 4.5; N, 2.7
Found: C, 55.7; H, 4.6; N, 2.5.

To a stirred solution of 2-(4-methoxyphenyl)ethylamine (6.05 g., 40 mmoles) in acetonitrile (40 ml.) is added dropwise a solution of N-benzyl-2-benzyloxy-5-(2-bromopropionyl)fluoromethanesulfonanilide (10.4 g., 20 mmoles) in acetonitrile (40 ml.). The reaction mixture is stirred for an additional 1.5 hours, then poured into diethyl ether (750 ml.). The mixture is filtered, then the filtrate is evaporated under vacuum. The residue from the evaporation is dissolved in dichloromethane, the solution is washed with water, dried, then partially evaporated under vacuum to a volume of 30 to 40 ml. This solution is added to 750 ml. of diethyl ether saturated with hydrogen chloride. The crude product (9.1 g., 73 percent) separates on cooling, is isolated by filtration, dissolved in acetonitrile (120 ml.), filtered, the solution warmed on a steam bath, then cooled. An ivory-white solid (6.6 g., 53 percent) precipitates and is isolated by filtration and dried. The infrared spectrum of the product is consistent with that expected for N-benzyl-2-benzyloxy-5-[2-(4'-methoxyphenethylamino)-propionyl]fluoromethanesulfonanilide hydrochloride, m.p. 213-216° C.

A solution of N-benzyl-2-benzyloxy-5-[2-(4'-methoxyphenethylamino)propionyl]fluoromethanesulfonanilide hydrochloride (23 g., 37 mmoles) in ethanol:water (90:10, 1,200 ml.) is obtained by warming the mixture. After cooling to 25° C. the solution is added to a paste of 2.0 g. 10 percent palladium on charcoal in water in a hydrogenation bottle. The mixture is hydrogenated for 16.5 hours in a Parr apparatus at about 40 p.s.i. of hydrogen. The mixture is carefully and thoroughly filtered, and the filtrate is evaporated under vacuum. The crude product (17 g., 100 percent) is dried by azeotropic distillation with benzene, then dissolved in acetonitrile and treated twice with decolorizing charcoal. Slow cooling provides the desired product as white crystals after filtration and drying (13 g., 80 percent). Another recrystallization provides white crystals of 2-hydroxy-5-[1-hydroxy-2-(4'-methoxyphenethylamino)propyl]fluoromethanesulfonanilide hydrochloride, m.p. 180°-183° C.
Analysis:
Calculated for $C_{19}H_{25}FN_2O_5S \cdot HCl$: C, 50.8; H, 5.8; N, 6.2
Found: C, 50.9; H, 5.6; N, 6.2.

What is claimed is:
1. The compound 2-hydroxy-5-[1-hydroxy-2-(4'-methoxyphenethylamino)propyl]fluoromethanesulfonanilide and its acid addition and metal salts.
2. Acid addition salts according to claim 1.
3. A hydrochloride salt according to claim 2.
4. The compound 2-benzyloxy-5-propionylfluoromethanesulfonanilide.
5. The compound 2-benzyloxy-5-(2-bromopropionyl)fluoromethanesulfonanilide.
6. The compound 2-benzyloxy-5-[2-(4'-methoxyphenethylamino)-propionyl]fluoromethanesulfonanilide hydrochloride.

* * * * *